United States Patent
Matsumoto

(10) Patent No.: US 11,563,371 B2
(45) Date of Patent: Jan. 24, 2023

(54) SWITCHING CONTROL CIRCUIT AND POWER SUPPLY CIRCUIT

(71) Applicant: FUJI ELECTRIC CO., LTD., Kawasaki (JP)

(72) Inventor: Shinji Matsumoto, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 162 days.

(21) Appl. No.: 17/078,281

(22) Filed: Oct. 23, 2020

(65) Prior Publication Data

US 2021/0167684 A1 Jun. 3, 2021

(30) Foreign Application Priority Data

Dec. 2, 2019 (JP) .............................. JP2019-217795

(51) Int. Cl.
*H02M 1/32* (2007.01)
*H02M 1/08* (2006.01)
*H02M 3/335* (2006.01)

(52) U.S. Cl.
CPC ............... *H02M 1/32* (2013.01); *H02M 1/08* (2013.01); *H02M 3/33571* (2021.05)

(58) Field of Classification Search
CPC ...... H02M 1/32; H02M 1/08; H02M 3/33569; H02M 3/01; H02M 3/33571
See application file for complete search history.

(56) References Cited

U.S. PATENT DOCUMENTS

| 5,297,014 A * | 3/1994 | Saito | H02H 7/1213 |
| | | | 363/21.13 |
| 2002/0089315 A1* | 7/2002 | Shi | G06F 1/26 |
| | | | 323/267 |
| 2006/0171175 A1* | 8/2006 | Zhu | H02M 3/33507 |
| | | | 363/21.12 |
| 2022/0166303 A1* | 5/2022 | Matsumoto | H02M 1/0003 |

FOREIGN PATENT DOCUMENTS

JP H09-246931 A 9/1997
JP 2005-287248 A 10/2005

* cited by examiner

Primary Examiner — Kyle J Moody
(74) Attorney, Agent, or Firm — Rabin & Berdo, P.C.

(57) ABSTRACT

A switching control circuit for controlling switching of a transistor in a power supply circuit, such that the power supply circuit generates an output voltage at a target level. The switching control circuit includes an overload detection circuit detecting that a load of the power supply circuit is in an overload condition, when a voltage according to the output voltage reaches a predetermined level, an overcurrent detection circuit detecting that a load current is an overcurrent, when a current according to the load current reaches a predetermined value, an adjustment circuit decreasing the predetermined value, when a first time period has elapsed since the load becomes in the overload condition, a drive circuit driving the transistor such that the output voltage reaches the target level, and a control circuit causing the drive circuit to stop driving the transistor, after the load becomes in the overload condition or the load current becomes the overcurrent.

17 Claims, 7 Drawing Sheets

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2019-217795 filed on Dec. 2, 2019, the entire disclosure of which is hereby incorporated by reference herein.

BACKGROUND

Technical Field

The present disclosure relates to a switching control circuit and a power supply circuit.

Description of the Related Art

A power supply circuit comprises an overcurrent detection circuit for detecting that a load current is an overcurrent when a current according to a load current is greater than a predetermined current value. When the load current becomes an overcurrent, the operation of the power supply circuit may be stopped to protect the power supply circuit (for example, Japanese Patent Application Publication No. H9-246931, Japanese Patent Application Publication No. 2005-287248).

Incidentally, when the load of the power supply circuit becomes an overload condition, an output voltage decreases, and a load current increases. Thus, when the output voltage decreases and the overload condition is detected, for example, a control circuit that controls the power supply circuit may decrease a predetermined current value for detecting an overcurrent so that the overcurrent detection circuit can detect an overcurrent more reliably.

However, when such a power supply circuit is supplied with power and activated, the output voltage during activation is low, and accordingly the predetermined current value for detecting an overcurrent is small. Consequently, this may stop the activation of the power supply circuit.

The present disclosure has been achieved in view of an issue as described above, and an object thereof is to provide a switching control circuit capable of appropriately operating a power supply circuit while protecting the power supply circuit from an overcurrent.

SUMMARY

A first aspect of the present disclosure for solving an issue described above is a switching control circuit for controlling a power supply circuit that includes a transformer including a primary coil provided on a primary side thereof, and a secondary coil provided on a secondary side thereof, and a transistor that controls a current of the primary coil, the switching control circuit being configured to control switching of the transistor such that the power supply circuit generates an output voltage at a target level on the secondary side, the switching control circuit comprising: an overload detection circuit that detects that a load of the power supply circuit is in an overload condition, when a voltage according to the output voltage reaches a predetermined level; an overcurrent detection circuit that detects that a load current flowing through the load is an overcurrent, when a current according to the load current reaches a predetermined value; an adjustment circuit capable of decreasing the predetermined value, when a first time period has elapsed since the load becomes the overload condition; a drive circuit that drives the transistor such that the output voltage reaches the target level; and a control circuit that causes the drive circuit to stop driving the transistor, after the load becomes the overload condition or the load current becomes the overcurrent.

A second aspect of the present disclosure is a power supply circuit, comprising: a transformer including a primary coil provided on a primary side thereof and a secondary coil provided on a secondary side thereof, the power supply circuit generating an output voltage at a target level on the secondary side of the transformer; a transistor that controls a current of the primary coil; and a switching control circuit that controls switching of the transistor, the switching control circuit including an overload detection circuit that detects that a load of the power supply circuit is in an overload condition, when a voltage according to the output voltage reaches a predetermined level, an overcurrent detection circuit that detects that a load current flowing through the load is an overcurrent, when a current according to the load current reaches a predetermined value, an adjustment circuit capable of decreasing the predetermined value, when a first time period has elapsed since the load becomes the overload condition, a drive circuit that drives the transistor such that the output voltage reaches the target level, and a control circuit that causes the drive circuit to stop driving the transistor, after the load becomes the overload condition or the load current becomes the overcurrent.

DETAILED DESCRIPTION

At least following matters will become apparent from the description in the present specification and the accompanying drawings.

Embodiment of Present Disclosure

Outline of Switching Power Supply Circuit 10

Figure 1:
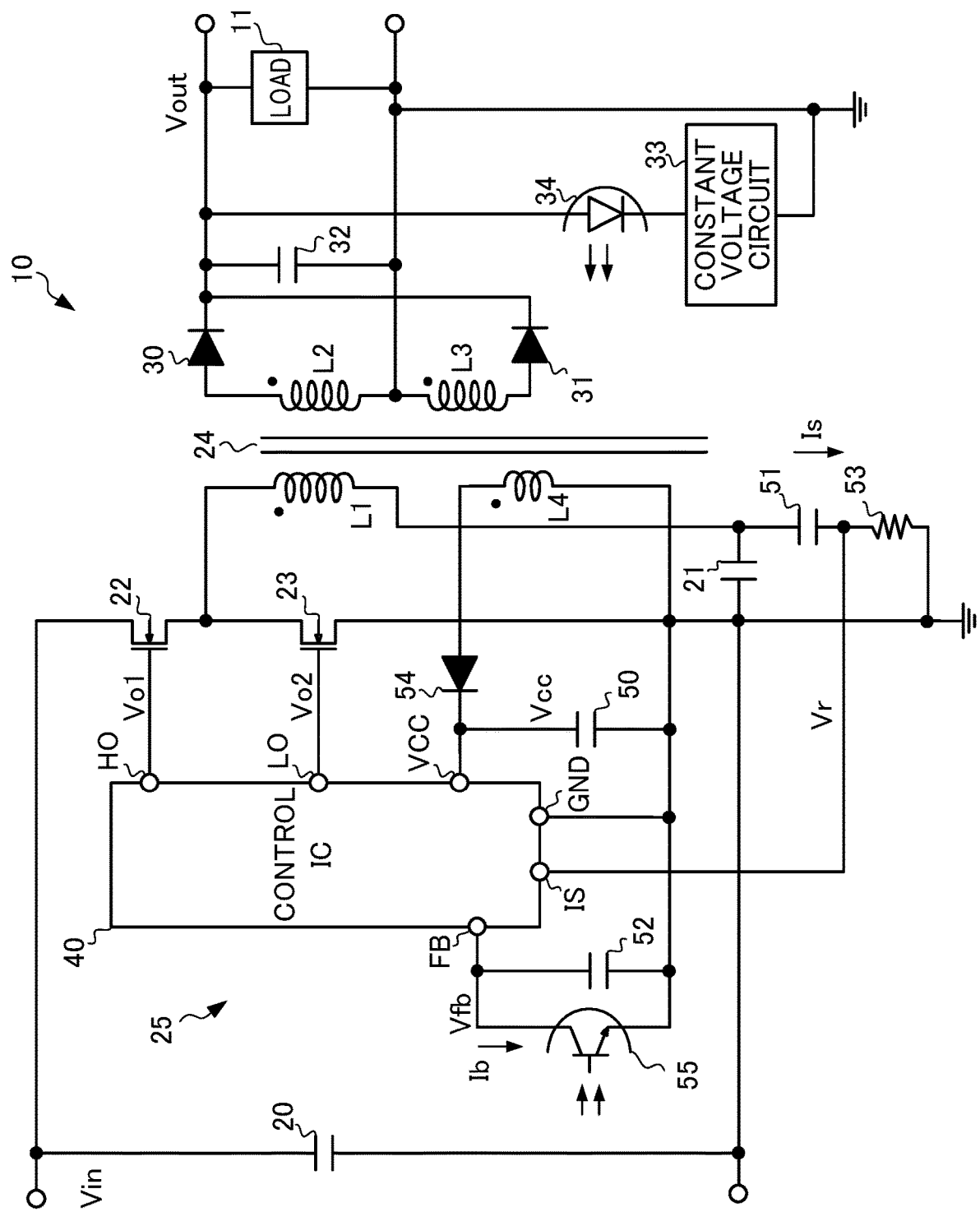
FIG. 1 is a diagram illustrating an example of a switching power supply circuit 10.

FIG. 1 is a diagram illustrating a configuration of a switching power supply circuit 10 according to an embodiment of the present disclosure. The switching power supply circuit 10 is an LLC current resonant converter that applies an output voltage Vout at a target level to a load 11 from a predetermined input voltage Vin.

The switching power supply circuit 10 includes capacitors 20, 21, and 32, NMOS transistors 22 and 23, a transformer 24, a control block 25, diodes 30 and 31, a constant voltage circuit 33, and a light-emitting diode 34.

The capacitor 20 stabilizes a voltage between a power supply line to which the input voltage Vin is applied and a ground line on the ground side, to remove noise and the like. The input voltage Vin is a direct current voltage at a predetermined level. The capacitor 21 is a so-called resonant capacitor that constitutes a resonant circuit with leakage inductances between a primary coil L1 and secondary coils L2 and L3.

The NMOS transistor 22 is a high-side power transistor, and the NMOS transistor 23 is a low-side power transistor. Although the NMOS transistors 22 and 23 are used as a switching device in an embodiment of the present disclosure, for example, a PMOS transistor or a bipolar transistor may be used.

The transformer 24 comprises the primary coil L1, the secondary coils L2 and L3, and an auxiliary coil L4, where the primary coil L1, the secondary coils L2 and L3, and the auxiliary coil L4 are insulated from one another. In the transformer 24, a voltage is generated in the secondary coils L2 and L3 on the secondary side according to a variation in the voltage across the primary coil L1 on the primary side. Likewise, a voltage is generated in the auxiliary coil L4 on the primary side according to a variation in the voltage across the primary coil L1 on the primary side, by extension to a variation in the voltage of the secondary coils L2 and L3.

The primary coil L1 has one end connected with a source of the NMOS transistor 22 and the drain of the NMOS transistor 23, and the other end connected with a source of the NMOS transistor 23 through the capacitor 21.

Accordingly, when the switching of the NMOS transistors 22 and 23 is started, the voltage of the secondary coils L2 and L3 and the voltage of the auxiliary coil L4 varies. The primary coil L1 and the secondary coils L2 and L3 are electromagnetically coupled with the same polarity, and the secondary coils L2 and L3 and the auxiliary coil L4 are also electromagnetically coupled with the same polarity.

The control block 25 is a circuit block that controls the switching of the NMOS transistors 22 and 23, and the details thereof will be described later in detail.

The diodes 30 and 31 rectify the voltage of the secondary coils L2 and L3, and the capacitor 32 smooths the rectified voltage. Consequently, the smoothed output voltage Vout is generated in the capacitor 32. Note that the output voltage Vout results in a direct current voltage at the target level.

The constant voltage circuit 33 generates a constant direct current voltage, and is configured with a shunt regulator, for example.

The light-emitting diode 34 is a device that emits light having an intensity according to a difference between the output voltage Vout and an output of the constant voltage circuit 33, and constitutes a photo coupler with a photo transistor 55 which will be described later. In an embodiment of the present disclosure, when the level of the output voltage Vout rises, the intensity of the light from the light-emitting diode 34 increases.

Control Block 25

The control block 25 includes a control IC 40, capacitors 50 to 52, a resistor 53, a diode 54, and the photo transistor 55.

The control IC 40 is an integrated circuit that controls the switching of the NMOS transistors 22 and 23 and includes terminals VCC, GND, FB, IS, HO, and LO. The control IC 40 corresponds to a "switching control circuit".

The terminal VCC is a terminal to which a power supply voltage Vcc for operating the control IC 40 is applied. The terminal VCC is connected with one end of the capacitor 50 having the other end grounded and with a cathode of the diode 54. Accordingly, the capacitor 50 is charged with a current from the diode 54, and the charge voltage of the capacitor 50 results in the power supply voltage Vcc for operating the control IC 40. The control IC 40 is activated with a divided voltage of the input voltage Vin being applied through a terminal not illustrated, and when the power supply voltage Vcc becomes higher than a predetermined level, the control IC 40 operates based on the power supply voltage Vcc.

The terminal GND is a terminal to which a ground voltage is applied, and is connected to a housing or the like of a device in which the switching power supply circuit 10 is provided, for example.

The terminal FB is a terminal at which a feedback voltage Vfb according to the output voltage Vout is to be generated, and to which the capacitor 52 and the photo transistor 55 are connected. The capacitor 52 is provided to remove noise between the terminal FB and the ground, and the photo transistor 55 allows a bias current Ib having a magnitude according to the intensity of the light emitted from the light-emitting diode 34 to flow from the terminal FB to the ground. Thus, the photo transistor 55 operates as a transistor that generates a sink current.

The terminal IS is a terminal for detecting a current value of a resonant current (hereinafter, referred to as a current Is) of the primary coil L1. A voltage Vr according to the current value of the current Is is generated at the terminal IS, which is connected with a node that is connected with the capacitor 51 and the resistor 53.

Here, the current value of the current Is varies with the input power of the switching power supply circuit 10. In addition, the input power of the switching power supply circuit 10 varies with the power consumed in the load 11, that is, a current flowing through the load 11 when the output voltage Vout is at the target level (hereinafter, referred to as a "load current"). Thus, the current Is and the voltage Vr vary with the "load current".

The terminal HO is a terminal from which a signal Vo1 for driving the NMOS transistor 22 is output, and with which the gate of the NMOS transistor 22 is connected.

The terminal LO is a terminal from which a signal Vo2 for driving the NMOS transistor 23 is output, and with which a gate of the NMOS transistor 23 is connected.

Details of Control IC 40

Figure 2:
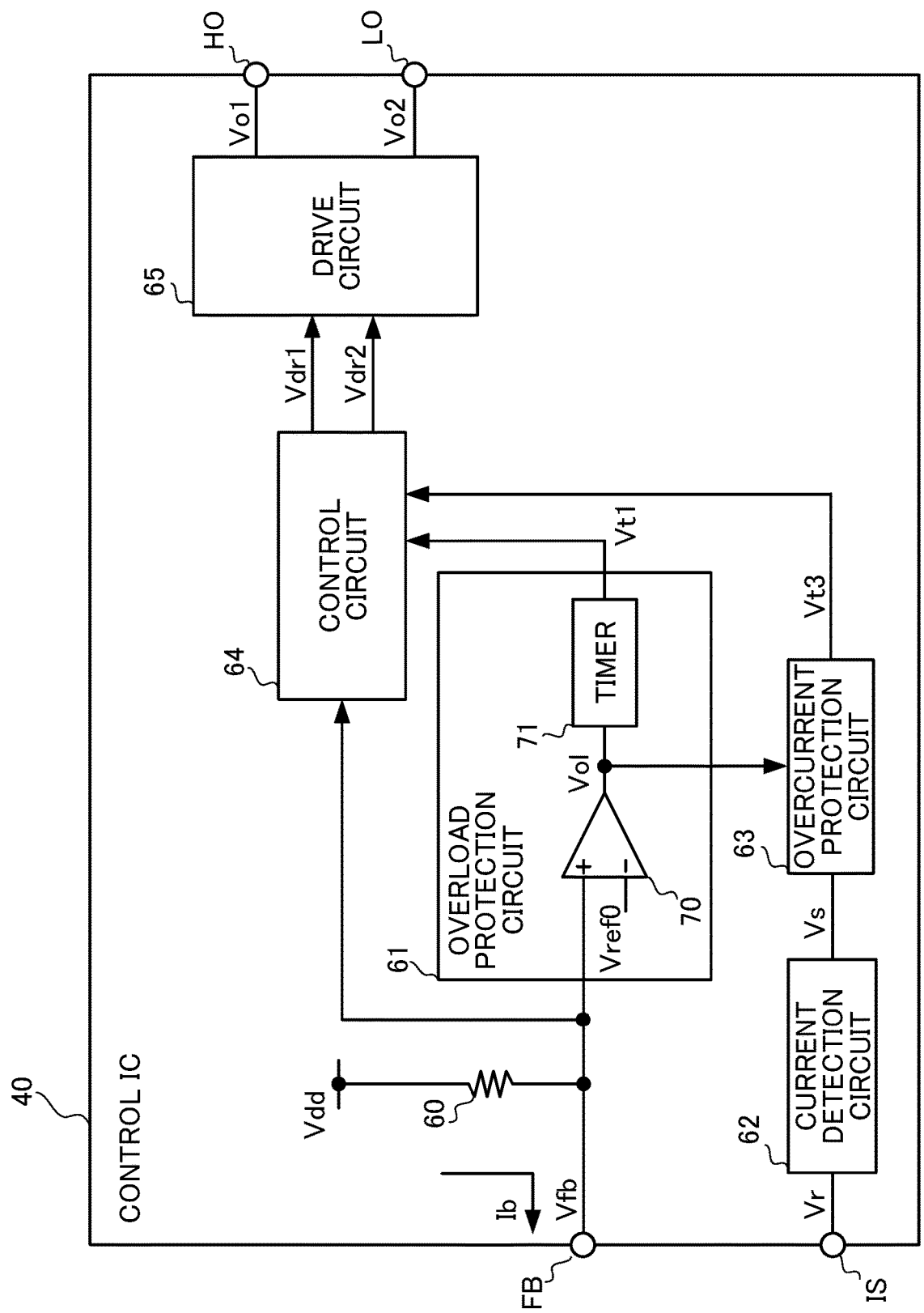
FIG. 2 is a diagram illustrating an example of a control IC 40.

FIG. 2 is a diagram illustrating an example of a configuration of the control IC 40. The control IC 40 comprises a resistor 60, an overload protection circuit 61, a current detection circuit 62, an overcurrent protection circuit 63, a control circuit 64, and a drive circuit 65. In FIG. 2, the terminals VCC and GND are omitted.

The resistor 60 generates the feedback voltage Vfb based on the bias current Ib from the photo transistor 55. The resistor 60 has one end to which a predetermined voltage Vdd is applied, and the other end connected with the terminal FB. Thus, the feedback voltage Vfb generated at the terminal FB is given by Expression (1).

$$Vfb = Vdd - R \times Ib \tag{1}$$

where "R" is a resistor value of the resistor 60.

In an embodiment of the present disclosure, when the output voltage Vout increases, the intensity of the light from the light-emitting diode 34 increases, and accordingly the current value of the bias current Ib increases. On the other hand, when the output voltage Vout decreases, the intensity of the light from the light-emitting diode 34 decreases, and accordingly the current value of the bias current Ib decreases. Thus, for example, when the load 11 becomes the overload condition and the output voltage Vout decreases, the current value of the bias current Ib decreases, and accordingly the feedback voltage Vfb increases.

When a predetermined time period Ta has elapsed since the load 11 becomes the overload condition, the overload protection circuit 61 causes the control circuit 64 to stop generating drive signals Vrd1 and Vdr2. The overload protection circuit 61 comprises an overload detection circuit 70 and a timer 71.

The overload detection circuit 70 is a comparator that compares the feedback voltage Vfb that varies with the output voltage Vout to a reference voltage Vref0 at a predetermined level. When the feedback voltage Vfb becomes higher than the reference voltage Vref0, the overload detection circuit 70 outputs a voltage Vo1 at a high level indicating that the load 11 is in the overload condition.

The timer 71 outputs a voltage Vt1 at the high level for stopping the generation of the drive signals Vdr1 and Vdr2 when measuring the predetermined time period Ta since the voltage Vo1 at the high level is output. In addition, when the overload detection circuit 70 outputs the voltage Vo1 at an low level indicating that the load 11 is not in the overload condition, the timer 71 outputs the voltage Vt1 at the low level. The timer 71 corresponds to a "third timer circuit", and the predetermined time period Ta corresponds to a "third time period".

In addition, although the details will be described later, when the generation of the drive signals Vrd1 and Vdr2 is stopped, the switching of the NMOS transistors 22 and 23 is stopped. As a result, the switching power supply circuit 10 stops operating when the overload condition continues for the predetermined time period Ta, to thereby appropriately protect the switching power supply circuit 10.

Figure 3:
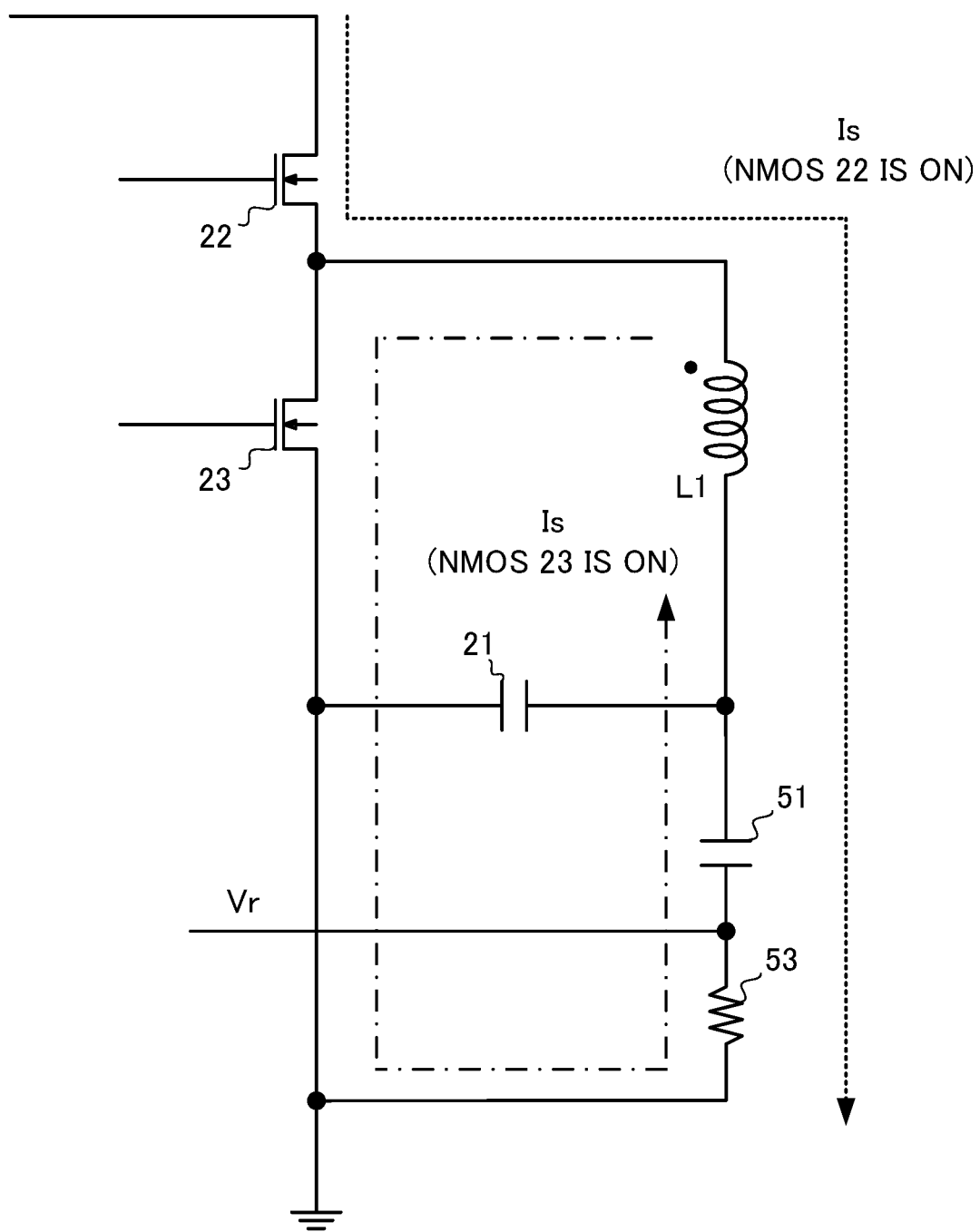
FIG. 3 is a diagram for describing a path of a current Is.

The current detection circuit 62 outputs a voltage Vs according to the magnitude of the current Is based on the voltage Vr. FIG. 3 is a diagram for describing a path of the current Is when the NMOS transistors 22 and 23 are switched in a complementary manner. When the NMOS transistor 22 is on and the NMOS transistor 23 is off, the path of the current Is corresponds to a path indicated by a "dotted line". On the other hand, when the NMOS transistor 22 is off and the NMOS transistor 23 is on, the path of the current Is corresponds to a path indicated by a "dashed-dotted line". Thus, the voltage Vr according to the current Is can take a "positive" or "negative" value.

For example, the current detection circuit 62 according to an embodiment of the present disclosure removes noise in the voltage Vr having a "positive" or "negative" value to smooth the voltage Vr, and thereafter the current detection circuit 62 outputs a value indicating a peak of the "positive" or "negative" voltage Vr, as the "positive" voltage Vs. Thus, the level of the voltage Vs indicates the magnitude of the current Is, that is, the magnitude of the "load current". The current detection circuit 62 comprises a low-pass filter and a peak hold circuit, for example.

In an embodiment of the present disclosure, the value indicating the peak of the smoothed voltage Vr with noise removed is output as the voltage Vs. However, any circuit may be used as long as the circuit can output the voltage Vs according to the magnitude of the current Is.

Figure 4:
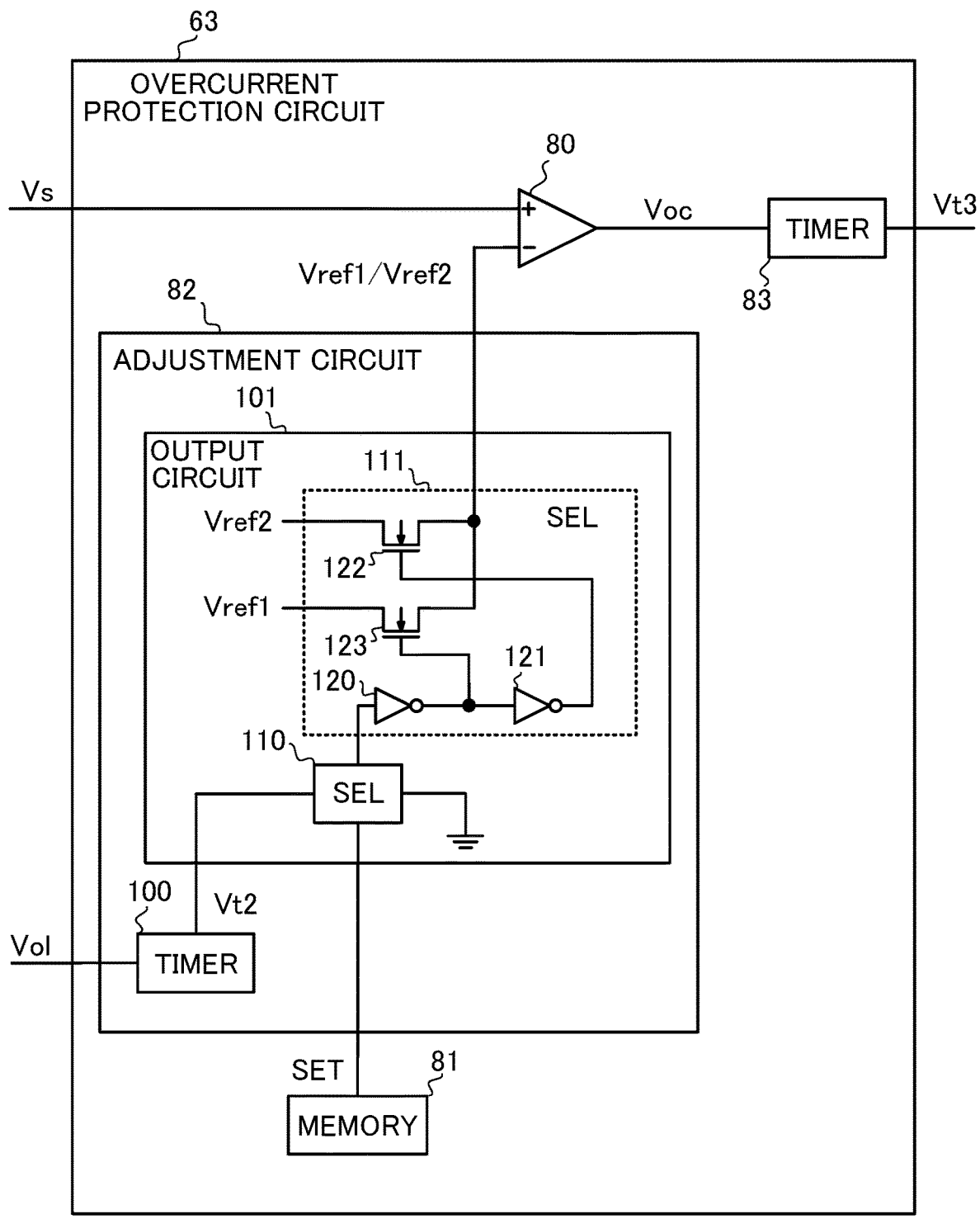
FIG. 4 is a diagram illustrating an example of an overcurrent protection circuit 63.

When a predetermined time period Tb has elapsed since the "load current" becomes an overcurrent, the overcurrent protection circuit 63 causes the control circuit 64 to stop outputting the drive signals Vrd1 and Vdr2. As illustrated in FIG. 4, the overcurrent protection circuit 63 comprises an overcurrent detection circuit 80, a memory 81, an adjustment circuit 82, and a timer 83.

The overcurrent detection circuit 80 compares the voltage Vs indicating the magnitude of the current Is according to the "load current" to a reference voltage (described later) corresponding to a predetermined current value (hereinafter, referred to as a "predetermined value"), to detect whether the "load current" is an overcurrent. Specifically, the overcurrent detection circuit 80 is a comparator that compares the voltage Vs to the reference voltage, and outputs a voltage Voc at the high level indicating that the "load current" is an overcurrent when the voltage Vs is higher than the reference voltage.

The memory 81 is a memory circuit that stores setting information SET for setting whether to decrease or maintain the "predetermined value" for detecting an overcurrent, when the predetermined time period Tb has elapsed since the load 11 becomes an overload condition. In an embodiment of the present disclosure, in the case of decreasing the "predetermined value", data of the "high level" is stored in the memory 81 as the "setting information SET", and in the case of maintaining the "predetermined value", data of the "low level" is stored in the memory 81 as the "setting information SET".

The adjustment circuit 82 is a circuit capable of adjusting the "predetermined value" for detecting an overcurrent based on the voltage Vo1 at the high level indicating that the load 11 is in the overload condition and the "setting information SET". The adjustment circuit 82 comprises a timer 100 and an output circuit 101.

The timer 100 measures the predetermined time period Tb since the load 11 becomes the overload condition based on the voltage Vo1 at the high level, and then changes a voltage Vt2 from the low level to the high level. When the overload detection circuit 70 outputs the voltage Vo1 at the low level indicating that the load 11 is not in the overload condition, the timer 100 outputs the voltage Vt2 at the low level. Note that the timer 100 corresponds to a "first timer circuit", and the predetermined time period Tb corresponds to a "first time period".

The output circuit 101 outputs either a reference voltage Vref1 or a reference voltage Vref2, serving as a reference for an overcurrent, as the "predetermined value" based on the voltage Vt2 and the "setting information SET". The output circuit 101 comprises selectors (SELs) 110 and 111.

The reference voltage Vref1 according to an embodiment of the present disclosure is a voltage corresponding to a current value I1, and the reference voltage Vref2 is a voltage corresponding to a current value I2 smaller than the current value I1. The reference voltage Vref1 corresponds to a "first voltage", the current value I1 corresponds to a first value", the reference voltage Vref2 corresponds to a "second voltage", and the current value I2 corresponds to a "second value".

The selector 110 selects the voltage Vt2 based on the "setting information" at the high level for decreasing the "predetermined value" serving as a reference for an overcurrent, and outputs the voltage Vt2 to the selector 111. On the other hand, the selector 110 selects a ground voltage at the low level based on the "setting information" at the "L level" for maintaining the "predetermined value", and outputs the ground voltage to the selector 111.

The selector 111 is a circuit that selects either the reference voltage Vref1 or the reference voltage Vref2 based on the voltage level output from the selector 110, and outputs the selected voltage to the overcurrent detection circuit 80.

The selector 111 comprises inverters 120 and 121 and NMOS transistors 122 and 123.

For example, when the voltage at the low level is output from the selector 110, the NMOS transistor 122 is turned off, and the NMOS transistor 123 is turned on. As a result, the selector 111 outputs the reference voltage Vref1.

On the other hand, when the selector 110 outputs the voltage at the high level, the NMOS transistor 122 is turned on, and the NMOS transistor 123 is turned off. As a result, the selector 111 outputs the reference voltage Vref2.

Accordingly, when the "setting information" at the "low level" for maintaining the "predetermined value" is stored in the memory 81, the ground voltage at the low level is input to the selector 111, and thus the "reference voltage Vref1" continues to be output. Consequently, the "predetermined value" for detecting an overcurrent results in the "current value I1".

On the other hand, when the "setting information" at the high level for decreasing the "predetermined value" is stored in the memory 81, the voltage Vt2 is input to the selector 111. Then, when the load 11 is not in the overload condition, the voltage Vt2 at the low level is output, and thus the selector 111 outputs the "reference voltage Vref1".

When the time period Tb has elapsed since the load 11 becomes the overload condition, the voltage Vt2 at the high level is output, and thus the selector 111 outputs the "reference voltage Vref2". Consequently, when the time period Tb has elapsed since the load 11 becomes the overload condition, the adjustment circuit 82 is able to decrease the "predetermined value" for detecting an overcurrent from the "current value I1" to the "current value I2 (<I1)".

The timer 83 outputs the voltage Vt3 at the high level for stopping the generation of the drive signals Vrd1 and Vdr2, when measuring a predetermined time period Tc since the voltage Voc at the high level is output. When the overcurrent detection circuit 80 outputs the voltage Voc at the low level indicating that the current of the load 11 is not an overcurrent, the timer 83 outputs a voltage Vt3 at the low level. Note that the timer 83 corresponds to a "second timer circuit", and the predetermined time period Tc corresponds to a "second time period".

The control circuit 64 in FIG. 2 outputs the drive signals Vrd1 and Vdr2 for causing the output voltage Vout to reach the target level based on the feedback voltage Vfb. Both of the drive signals Vrd1 and Vdr2 according to an embodiment of the present disclosure are signals with a duty ratio of the high level of 50%.

When the load 11 continues to be in the overload condition for the time period Ta and the voltage Vt1 at the high level is output, or when the "load current" continues to be an overcurrent for the time period Tc and the voltage Vt3 at the high level is output, the control circuit 64 stops generating the drive signals Vrd1 and Vdr2.

The drive circuit 65 is a buffer that switches the NMOS transistors 22 and 23 in a complementary manner in response to the input drive signals Vrd1 and Vdr2. Specifically, the drive circuit 65 drives the NMOS transistor 22 using the signal Vo1 at the same logic level as that of the drive signal Vrd1, and drives the NMOS transistor 23 using the signal Vo2 at the same logic level as that of the drive signal Vdr2.

When the level of the output voltage Vout changes from the target level, the control circuit 64 changes the frequencies of the drive signals Vrd1 and Vdr2 such that the output voltage Vout reaches the target level. Accordingly, the switching power supply circuit 10 can generate the output voltage Vout at the target level.

Example of Operation in Overload condition of Switching Power Supply Circuit 10

Figure 5:
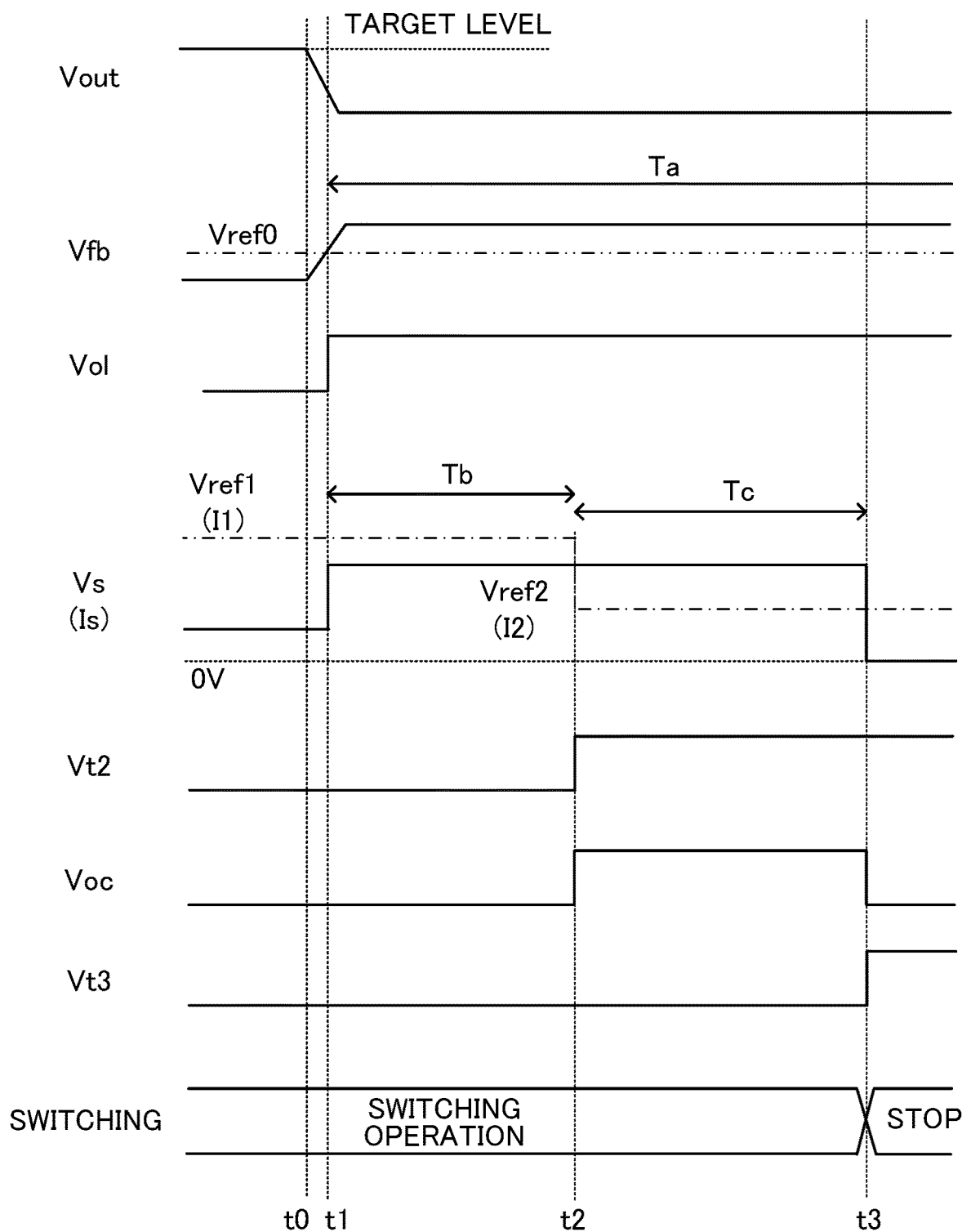
FIG. 5 is a diagram for describing an example of an operation in an overload condition of a switching power supply circuit 10.

FIG. 5 is a diagram for describing an example of an operation in the overload condition of the switching power supply circuit 10. It is assumed that, before time t0, the NMOS transistors 22 and 23 are switched, and the output voltage Vout at the target level is generated at the predetermined load 11. It is also assumed here that the "current value I1" for detecting an overcurrent is set to a relatively great value (for example, a current value of the "current Is" when nodes at which the output voltage Vout is generated are substantially under short-circuit condition). Hereinafter, in an embodiment of the present disclosure, it is assumed that the "setting information SET" at the high level is stored in the memory 81.

For example, when the load 11 of the switching power supply circuit 10 slightly exceeds a rated load at the time t0, the output voltage Vout decreases, and thus the feedback voltage Vfb increases. Then, when the feedback voltage Vfb becomes higher than the reference voltage Vref0 at time t1, the overload detection circuit 70 outputs the voltage Vo1 at the high level indicating that the load 11 is in the overload condition.

As described above, here, the "current value I1" for detecting an overcurrent is set to a relatively great value. Thus, at the time t1, the voltage Vs according to the current Is is lower than the reference voltage Vref1 indicating the "current value I1", and an overcurrent is not detected.

When the voltage Vo1 at the high level is output at the time t1, the timer 100 in FIG. 4 measures a time period during which the load 11 is in the overload condition. Then, at time t2 at which the predetermined time period Tb has elapsed from the time t1, the timer 100 changes the voltage Vt2 to the high level. As a result, the output circuit 101 outputs the reference voltage Vref2, and the "predetermined value" for detecting an overcurrent decreases from the "current value I1" to the "current value I2".

In addition, at the time t2, the voltage Vs according to the current Is is higher than the reference voltage Vref2 indicating the "current value I2", and thus the overcurrent detection circuit 80 outputs the voltage Voc at the high level indicating that the "load current" is an overcurrent.

The timer 83 measures a time period during which the "load current" is an overcurrent based on the voltage Voc at the high level. Then, at time t3 at which the predetermined time period Tc has elapsed from the time t2, the timer 83 changes the voltage Vt3 to the high level. As a result, the control circuit 64 stops generating the drive signals Vdr1 and Vdr2, and the switching of the NMOS transistors 22 and 23 is stopped. Accordingly, in an embodiment of the present disclosure, for example, when the load 11 exceeds the rated load and an overcurrent occurs, the switching power supply circuit 10 stops operating, and thus it is possible to protect the switching power supply circuit 10 from an overcurrent.

Example of Operations of Switching Power Supply Circuit 10

Figure 6:
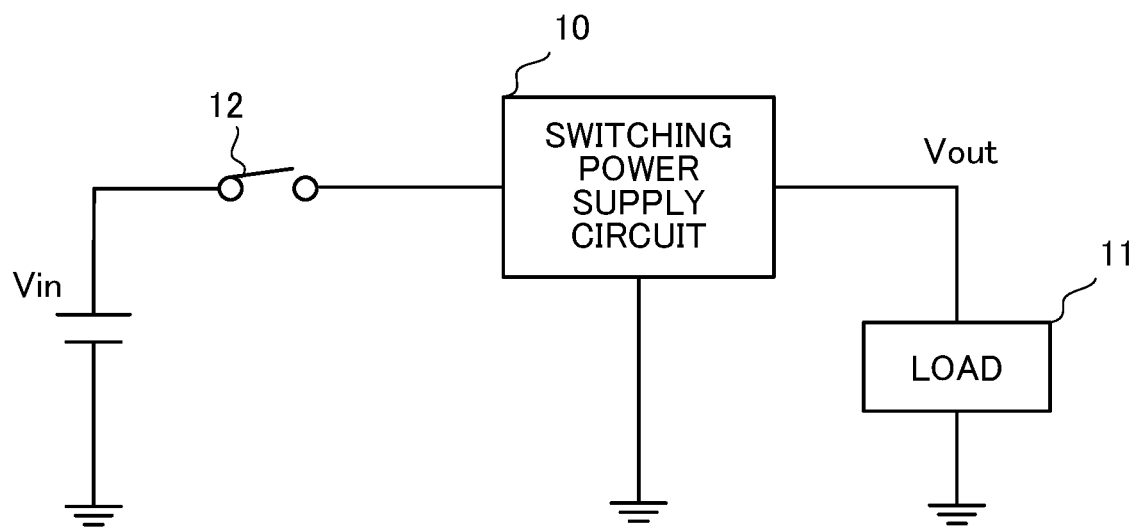
FIG. 6 is a diagram for describing activation of a switching power supply circuit 10.

FIG. 6 is a diagram for describing the activation of the switching power supply circuit 10. The "activation" herein means that, for example, a switch 12 is turned on, the switching power supply circuit 10 is supplied with the input voltage Vin (power supply voltage) for operating the switching power supply circuit 10, and then the output voltage Vout to the load 11 reaches the target level. In the example of FIG. 6, it is assumed that, for example, a rated load is used as the load 11, however, a load lighter than the rated load may be used. Here, the "setting information SET" at the high level is stored in the memory 81, as well.

Figure 7:
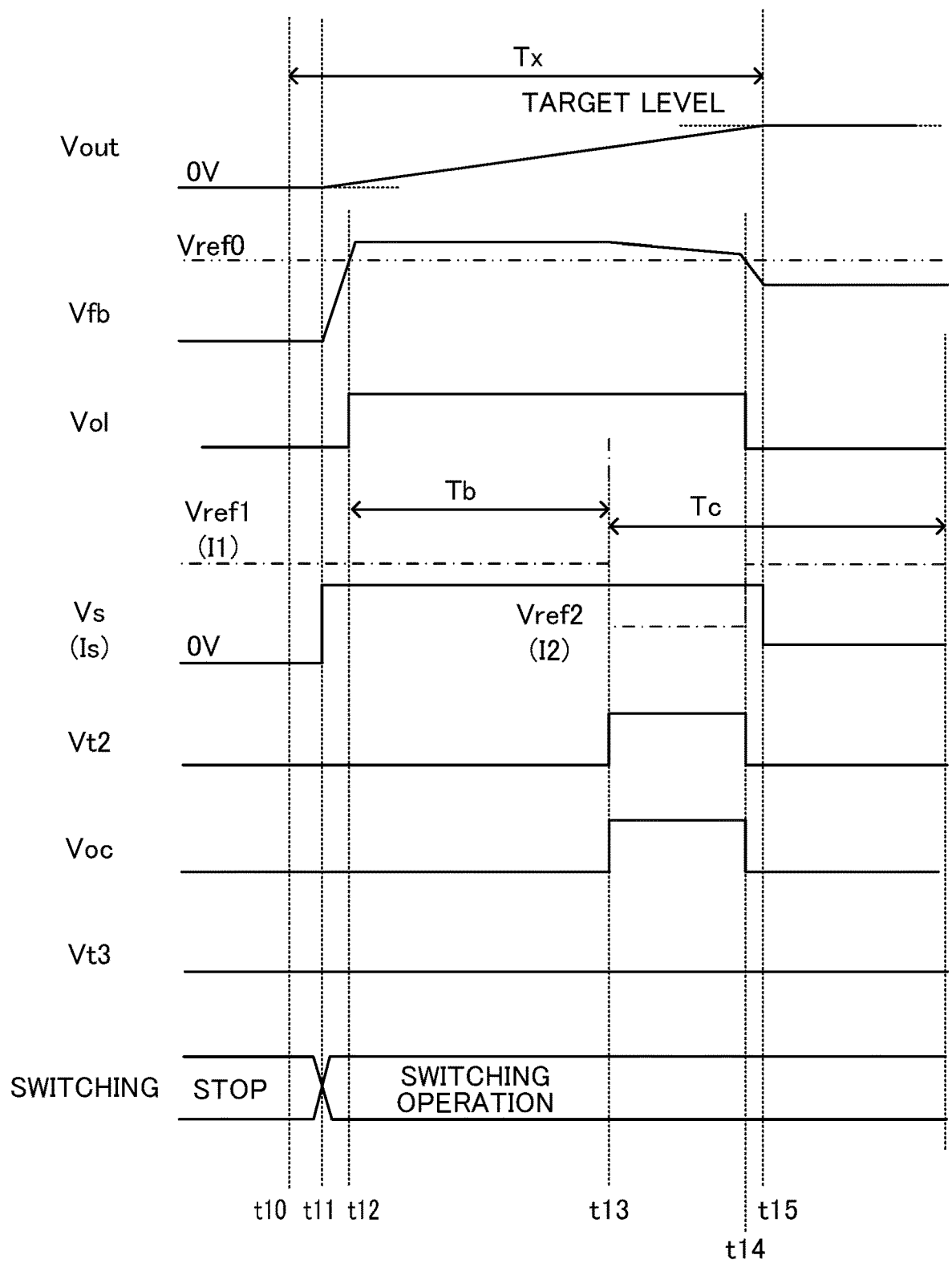
FIG. 7 is a diagram for describing an example of an operation on activation of a switching power supply circuit 10.

FIG. 7 is a diagram for describing an example of an operation in the activation of the switching power supply circuit 10. First, when the switch 12 is turned on at time t10, an activation circuit (not illustrated) of the control IC 40 charges the capacitor 50 based on a divided voltage of the input voltage Vin through a terminal not illustrated. Then, when the power supply voltage Vcc of the capacitor 50 becomes higher than a predetermined level at time t11, for example, the control circuit 64 generates the drive signals Vrd1 and Vdr2, and the switching operation of the NMOS transistors 22 and 23 is started.

When the switching operation is started at the time t11, the output voltage Vout gradually increases from "0V". It should be noted that, since the output voltage Vout at this point of time is considerably low, i.e., substantially "0V", the feedback voltage Vfb rises rapidly.

Then, when the feedback voltage Vfb becomes higher than the reference voltage Vref0 at time t12, the overload detection circuit 70 outputs the voltage Vo1 at the high level. The overload detection circuit 70 according to an embodiment of the present disclosure detects whether the load 11 is in the overload condition only based on the output voltage Vout. Accordingly, even in the case where the load 11 is not actually in the overload condition, the overload detection circuit 70 outputs the voltage Vo1 at the high level when the feedback voltage Vfb becomes higher than the reference voltage Vref0.

At time t13 at which the predetermined time period Tb has elapsed since the voltage Vo1 at the high level is output at the time t12, the timer 100 changes the voltage Vt2 to the high level. As a result, the output circuit 101 outputs the reference voltage Vref2, and the "predetermined value" for detecting an overcurrent decreases from the "current value I1" to the "current value I2".

At the time t13, since the voltage Vs according to the current Is becomes higher than the reference voltage Vref2 indicating the "current value I2", the overcurrent detection circuit 80 outputs the voltage Voc at the high level indicating that the "load current" is an overcurrent.

Incidentally, when the switching operation is started at the time t11 and the output voltage Vout increases to be close to the target level, the feedback voltage Vfb gradually decreases. Then, for example, when the feedback voltage Vfb becomes lower than the reference voltage Vref0 at time t14, the overload detection circuit 70 outputs the voltage Vo1 at the low level. As a result, the timer 100 changes the voltage Vt2 to the low level, and the "predetermined value" for detecting an overcurrent increases from the "current value I2" to the "current value I1".

Accordingly, at the time t14, the overcurrent detection circuit 80 outputs the voltage Voc at the low level indicating that the "load current" is not an overcurrent. Then, when the output voltage Vout increases to reach the target level at time t15, the activation of the switching power supply circuit 10 is completed.

In an embodiment of the present disclosure, the time periods Tb and Tc are set such that a time period Tx taken for the switching power supply circuit 10 for the "activation" is shorter than a time period corresponding to the sum of the time period Tb from a time when an overload is detected to a time when the "predetermined value" for detecting an overcurrent decreases and the time period Tc from a time when an overcurrent is detected to a time when the switching operation is stopped. Accordingly, it is possible to prevent the activation of the switching power supply circuit 10 from being erroneously stopped during the activation thereof. In FIG. 7, the time period Tx during which the switching power supply circuit 10 is being activated is the time period from the time t10 to the time t15.

SUMMARY

The switching power supply circuit 10 according to an embodiment of the present disclosure has been described above. The adjustment circuit 82 according to an embodiment of the present disclosure is capable of decreasing the "predetermined value" for detecting an overcurrent from the "current value I1" to the "current value I2" when the time period Tb has elapsed since the load 11 becomes the overload condition. That is, a user of the switching power supply circuit 10 can determine whether to decrease the "current value I1" to the "current value I2" according to the load 11. Accordingly, for example, even in the activation of the switching power supply circuit 10, it is possible to adjust the time period during which an overcurrent occurs. As a result, it is possible to prevent the switching power supply circuit 10 from being erroneously stopped during the activation thereof, to thereby be able to appropriately operate the switching power supply circuit 10 while protecting the switching power supply circuit 10 from an overcurrent.

When the "setting information" is at the high level and the time period Tb has elapsed since an overload is detected, the adjustment circuit 82 decreases the "predetermined value" from the "current value I1" to the "current value I2". If the "predetermined value" is set to the "current value I2" immediately without providing the time period Tb, the condition of an overcurrent continues for only the time period Tc, and the activation of the switching power supply circuit 10 is stopped. However, for example, as illustrated in FIG. 7, the "predetermined value" is set to the "current value I2" when the time period Tb has elapsed since the load 11 becomes the overload condition, and thus it is possible to reliably activate the switching power supply circuit 10.

Moreover, for example, when the "current value I1" for detecting an overcurrent is set small and the "current value I1" is changed to the "current value I2" which is a smaller value, the noise of the current Is may affect this process. In an embodiment of the present disclosure, the adjustment circuit maintains the "predetermined value" for detecting an overcurrent regardless of the condition of the load 11 when the "setting information" stored in the memory 81 is at the low level, and thus the noise of the current Is may be less likely to affect the process.

Furthermore, when the "setting information" is at the high level, the output circuit 101 can decrease the "predetermined value" for detecting an overcurrent from the reference voltage Vref1 with respect to the "current value I1", by outputting the reference voltage Vref2 with respect to the "current value I2" to the overcurrent detection circuit 80.

On the other hand, when the "setting information" is at the low level, the output circuit 101 can maintain the "predetermined value" by continuously outputting the reference voltage Vref1 with respect to the "current value I1" to the overcurrent detection circuit 80.

In addition, in an embodiment of the present disclosure, when the time period Tc has elapsed since the overcurrent detection circuit 80 detects an overcurrent, the control circuit 64 stops the switching operation of the switching power supply circuit 10. Thus, even when the overcurrent detection circuit 80 erroneously detects an overcurrent due to noise or the like, the operation of the switching power supply circuit 10 is not immediately stopped.

Moreover, in an embodiment of the present disclosure, the time periods Tb and Tc are set such that the time period Tx taken for the "activation" of the switching power supply circuit 10 is shorter than a time period corresponding to the sum of the time period Tb and the time period Tc illustrated in FIG. 7. Accordingly, it is possible to prevent the activation of the switching power supply circuit 10 from being erroneously stopped during the activation thereof.

Furthermore, in an embodiment of the present disclosure, when the time period Ta has elapsed since the overload detection circuit 70 detects an overload, the control circuit 64 stops the switching operation of the switching power supply circuit 10. This makes it possible to prevent the overload condition from continuing for a long time during the operation of the switching power supply circuit 10.

Additionally, when both an overload and an overcurrent occur, the switching power supply circuit 10 is likely to be broken due to an overcurrent. In an embodiment of the present disclosure, the time period Tc is designed to be shorter than the time period Ta, it is possible to reliably prevent the breakage of the switching power supply circuit 10.

Others

For example, the switching power supply circuit 10 may be subjected to a test in which the load is changed between a "heavy load" and a "light load" in a "predetermined cycle". In such a case, the time periods Tb and Tc may be set such that a time period during which the load is the "heavy load" in a predetermined cycle is shorter than the time period corresponding to the sum of the time period Tb and the time period Tc. By setting the time period as such, it is possible to prevent the operation from being erroneously stopped during the switching power supply circuit 10 being subjected to the test.

In addition, in an embodiment of the present disclosure the control IC 40 is used in the switching power supply circuit 10, which is an LLC current resonant converter, however, it is not limited thereto. For example, an embodiment of the present disclosure can obtain similar effects even if the control IC 40 is used in a flyback switching power supply circuit or forward switching power supply circuit instead of the LLC current resonant converter.

Moreover, for example, in a case where only the time period Tc is set longer than the time period Tx without providing the time period Tb, the activation of the switching power supply circuit 10 should not be stopped. However, in such a case, the time period Tc from a time when an overcurrent is detected to a time when the operation of the switching power supply circuit 10 is stopped, results in being long. Thus, by setting the time period Tb and the time period Tc longer than the time period Tx as in an embodiment of the present disclosure, it is possible to appropriately protect the switching power supply circuit 10 from an overcurrent.

Embodiment(s) of the present disclosure described above is/are simply for facilitating the understanding of the present disclosure and is/are not in any way to be construed as limiting the present disclosure. The present disclosure may variously be changed or altered without departing from its gist and encompass equivalents thereof.

What is claimed is:

1. A switching control circuit for controlling a power supply circuit that includes
   a transformer including a primary coil provided on a primary side thereof, and a secondary coil provided on a secondary side thereof, and
   a transistor that controls a current of the primary coil, the switching control circuit being configured to control switching of the transistor such that the power supply circuit generates an output voltage at a target level on the secondary side, the switching control circuit comprising:
   an overload detection circuit that detects that a load of the power supply circuit is in an overload condition, when the output voltage is below a predetermined level;
   an overcurrent detection circuit that detects that a transistor current corresponding to a load current flowing through the load is an overcurrent, when the transistor current reaches a predetermined value, the transistor current flowing through the transistor;
   an adjustment circuit capable of decreasing the predetermined value, when a first time period has elapsed since the load becomes the overload condition;
   a drive circuit that drives the transistor such that the output voltage reaches the target level;
   a control circuit that causes the drive circuit to stop driving the transistor, after the load becomes the overload condition or the load current becomes the overcurrent; and
   a memory circuit that stores setting information for setting whether to decrease the predetermined value or to maintain the predetermined value, wherein
   the adjustment circuit decreases the predetermined value, when the setting information for decreasing the predetermined value is stored in the memory circuit and the first time period has elapsed since the load becomes the overload condition.

2. The switching control circuit according to claim 1, wherein
   the adjustment circuit maintains the predetermined value regardless of whether the load is in the overload condition or not, when the setting information for maintaining the predetermined value is stored in the memory circuit.

3. The switching control circuit according to claim 1, wherein
   the adjustment circuit comprises
   a first timer circuit that measures the first time period since the load becomes the overload condition, and
   an output circuit that, in a case when the setting information for decreasing the predetermined value is stored in the memory circuit,
      outputs a first voltage indicating a first value as the predetermined value, until the first time period has elapsed since the load becomes the overload condition, and
      outputs a second voltage indicating a second value smaller than the first value as the predetermined value, when the first time period has elapsed since the load becomes the overload condition.

4. The switching control circuit according to claim 3, wherein
   the output circuit outputs the first voltage as the predetermined value regardless of whether the load is in the overload condition or not, in a case when the setting information for maintaining the predetermined value is stored in the memory circuit.

5. A switching control circuit for controlling a power supply circuit that includes
   a transformer including a primary coil provided on a primary side thereof, and a secondary coil provided on a secondary side thereof, and
   a transistor that controls a current of the primary coil, the switching control circuit being configured to control switching of the transistor such that the power supply circuit generates an output voltage at a target level on the secondary side, the switching control circuit comprising:

an overload detection circuit that detects that a load of the power supply circuit is in an overload condition, when the output voltage is below a predetermined level;

an overcurrent detection circuit that detects that a transistor current corresponding to a load current flowing through the load is an overcurrent, when the transistor current reaches a predetermined value, the transistor current flowing through the transistor;

an adjustment circuit capable of decreasing the predetermined value, when a first time period has elapsed since the load becomes the overload condition;

a drive circuit that drives the transistor such that the output voltage reaches the target level;

a second timer circuit that measures a second time period since the load current becomes the overcurrent, and a control circuit that causes the drive circuit to stop driving the transistor, after the load becomes the overload condition or the load current becomes the overcurrent, wherein the control circuit causes the drive circuit to stop driving the transistor when the second time period has elapsed since the load current becomes the overcurrent.

6. The switching control circuit according to claim 5, wherein a time period from a time when power is supplied to operate the switching control circuit to a time when the output voltage reaches the target level is shorter than a time period corresponding to a sum of the first time period and the second time period.

7. The switching control circuit according to claim 5, further comprising:

a third timer circuit that measures a third time period since the load becomes the overload condition, wherein the control circuit causes the drive circuit to stop driving the transistor when the third time period has elapsed since the load becomes the overload condition.

8. The switching control circuit according to claim 7, wherein the second time period is shorter than the third time period.

9. A switching control circuit for controlling a power supply circuit that includes a transformer including a primary coil provided on a primary side thereof, and a secondary coil provided on a secondary side thereof, and a transistor that controls a current of the primary coil, the switching control circuit being configured to control switching of the transistor such that the power supply circuit generates an output voltage at a target level on the secondary side, the switching control circuit comprising:

an overload detection circuit that detects that a load of the power supply circuit is in an overload condition, when the output voltage is below a predetermined level;

an overcurrent detection circuit that detects that a transistor current corresponding to a load current flowing through the load is an overcurrent, when the transistor current reaches a predetermined value, the transistor current flowing through the transistor;

an adjustment circuit capable of decreasing the predetermined value, when a first time period has elapsed since the load becomes the overload condition;

a drive circuit that drives the transistor such that the output voltage reaches the target level; and a control circuit that causes the drive circuit to stop driving the transistor according to a first stop instruction signal from the overload detection circuit, after the load becomes the overload condition, wherein the control circuit causes the drive circuit to stop driving the transistor according to a second stop instruction signal from the overcurrent detection circuit, after the transistor current becomes the overcurrent.

10. The switching control circuit according to claim 9, further comprising a memory circuit that stores setting information for setting whether to decrease the predetermined value or to maintain the predetermined value, wherein the adjustment circuit decreases the predetermined value, when the setting information for decreasing the predetermined value is stored in the memory circuit and the first time period has elapsed since the load becomes the overload condition.

11. The switching control circuit according to claim 10, wherein the adjustment circuit maintains the predetermined value regardless of whether the load is in the overload condition or not, when the setting information for maintaining the predetermined value is stored in the memory circuit.

12. The switching control circuit according to claim 10, wherein the adjustment circuit comprises a first timer circuit that measures the first time period since the load becomes the overload condition, and an output circuit that, in a case when the setting information for decreasing the predetermined value is stored in the memory circuit, outputs a first voltage indicating a first value as the predetermined value, until the first time period has elapsed since the load becomes the overload condition, and outputs a second voltage indicating a second value smaller than the first value as the predetermined value, when the first time period has elapsed since the load becomes the overload condition.

13. The switching control circuit according to claim 12, wherein the output circuit outputs the first voltage as the predetermined value regardless of whether the load is in the overload condition or not, in a case when the setting information for maintaining the predetermined value is stored in the memory circuit.

14. The switching control circuit according to claim 9, further comprising:

a second timer circuit that measures a second time period since the transistor current becomes the overcurrent, wherein the control circuit causes the drive circuit to stop driving the transistor when the second time period has elapsed since the load current becomes the overcurrent.

15. The switching control circuit according to claim 14, wherein a time period from a time when power is supplied to operate the switching control circuit to a time when the output voltage reaches the target level is shorter than a time period corresponding to a sum of the first time period and the second time period.

16. The switching control circuit according to claim 14, further comprising:

a third timer circuit that measures a third time period since the load becomes the overload condition, wherein the control circuit causes the drive circuit to stop driving the transistor when the third time period has elapsed since the load becomes the overload condition.

17. The switching control circuit according to claim 16, wherein
the second time period is shorter than the third time period.

* * * * *